US000001540H

United States Statutory Invention Registration [19]

[11] Reg. Number: H1540

Novinson

[45] Published: Jun. 4, 1996

[54] ELECTRICAL COMPONENTS FORMED OF LANTHANIDE CHALCOGENIDES AND METHOD OF PREPARATION

[75] Inventor: Thomas Novinson, Ventura, Calif.

[73] Assignee: The United States of America as represented by the Secretary of the Navy, Washington, D.C.

[21] Appl. No.: 283,478

[22] Filed: Jul. 29, 1994

Related U.S. Application Data

[63] Continuation-in-part of Ser. No. 86,981, Jun. 30, 1993, Pat. No. 5,458,865.

[51] Int. Cl.[6] ..... C01F 17/00

[52] U.S. Cl. ..... 423/263

[58] Field of Search ..... 156/63, 72; 252/508, 252/514, 501.1; 257/76, 425, 613, 431; 420/903; 423/508; 505/776, 777

[56] References Cited

U.S. PATENT DOCUMENTS 2,814,004 10/1957 Goodman ..... 257/76
4,061,505 12/1977 Hampl, Jr. ..... 136/238

FOREIGN PATENT DOCUMENTS 60-191006 9/1985 Japan ..... 423/508

OTHER PUBLICATIONS

"Rare Earth Copper Sulphides, $CulnS_2$" by T. Murugesan et al. Proc. Nucl. Phys. Solid State Phys. Symp. 25 (c) English pp. 123–124 (1982).

"Rare Earth Copper Sulphides ($LnCuS_2$)" by Murugesan et al.; Indian Journal of Chem. vol. 22A Jun. 1983 pp. 469–474.

"Chemical Principles" by Marterton et al.; 4th ed. pub. by W. B. Saunders Co. 1977 p. 153.

Chemical Abstract No. 105:182, 672n by Agaev et al.; Chem. Abstracts vol. 105 No. 20 17 Nov. 1986 p. 697.

*Primary Examiner*—Charles T. Jordan
*Assistant Examiner*—John R. Hardee
*Attorney, Agent, or Firm*—Melvin J. Sliwka

[57] ABSTRACT

Mixed metal chalcogenides formed of lanthanide chalcogenides having the formula $MLnX_2$ where M is selected from the group consisting of Ag, Cu and Au; Ln is one of the elements of the lanthanide family other than Pm and X is selected from the group consisting of S, Se and Te and having electrical properties that range from dielectrics to semiconductors to metallic conductors in a temperature range from −50° C. to in excess of +100° C. The lanthanide chalcogenides can be prepared by slow fusion of the basic elements such as silver, lanthanum and selenium, in substantially stoichiometric properties, in powder form under an extended time period at elevated temperature, e.g. 650° C. to 700° C.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRICAL COMPONENTS FORMED OF LANTHANIDE CHALCOGENIDES AND METHOD OF PREPARATION

This application is a continuation-in-part of U.S. patent application Ser. No. 08/086,981, filed June 30, 1993.

BACKGROUND OF THE INVENTION

1. Field of the Invention

The present invention relates generally to the preparation of electrical components formed of certain lanthanide chalcogenide compounds and, in particular, to the preparation of electrical components formed of silver and copper lanthanide chalcogenides.

2. Description of the Prior Art

The use of inorganic materials such as silicon and gallium arsenide in the formation of electronic circuits and microcircuits (e.g. thermal on off switch) for controlling the flow of current at varying temperatures is well known.

U.S. Pat. No. 2,814,004 to Goodman discloses an electrically semiconductive object comprising a body of semiconductive material which includes a chemical compound having a formula $MNX_2$ where M represents one of the elements copper and silver, N represents one of the elements aluminum, gallium, indium and thallium, and X represents one of the elements sulphur, selenium and tellurium. Goodman also discloses a method of producing an electrically semiconductive object by melting together in an inert atmosphere at high temperatures quantities of a first group of elements copper and silver, at least one of a second group of elements aluminum, gallium, indium and thallium and at least one of a third group of elements sulphur, selenium and tellurium in atomic proportions determined by the formula $MNX_2$ and then cooling the melt to form the semiconductor object upon solidification. The electrical components and the method of preparing the same as disclosed by Goodman are limited to semiconductors, that is transistor type devices such as a crystal diode.

Japanese Patent No. 60-191,006 discloses a method for preparing lanthanide sulfides, selenides and tellurides by heating a mixture of a lanthanide alkoxide with the appropriate hydrogen sulfide, hydrogen selenide or hydrogen telluride. The resultant metal sulphide, selenide and telluride can be used to prepare, for example, optical disc. The disclosure of Japanese Patent No. 60-191,006, however, does not suggest that the resultant metal sulphide, selenide and telluride have any electrical properties and thus are useful as semiconductors such as diodes or other electronic devices.

U.S. Pat. No. 4,061,505 to Hampl discloses certain N-type thermoelectric compositions based on a rare-earth metal selected from gadolium and erbium and a chalcogen selected from selenium and tellurium. The thermoelectric compositions of U.S. Pat. No. 4,061,505 may be used as thermoelectric legs in thermoelectric generators.

While the prior art discloses a very limited use of selenium or tellurium in the preparation of compositions which exhibit semiconductor characteristics, a detailed disclosure and analysis of the many useful electrical components which may be formed from certain lanthanide chalcogenide compounds is not found in the prior art.

SUMMARY OF THE INVENTION

According to the present invention, there is provided a family of electrical components which can function as insulators, dielectrics, semiconductors or metallic-like conductors, in the form of a series of non-metallic inorganic compounds, namely, silver and copper lanthanide chalcogenides, having varying electrical properties over a wide temperature range of about −50° C. to temperatures in excess of +100° C. The complex metal (copper and silver) lanthanide chalcogenides of the present invention are in the form or sulfides, selenides and tellurides. The silver and copper lanthanide chalcogenides of the invention may be used as electronic switching devices, diodes, photovoltaic cells and as infrared detector materials for infrared imaging and infrared spectrophotometers. Since the electrical properties of the silver and copper lanthanide chalcogenides of the invention are temperature dependent, these materials may also be used as temperature dependent electronic switches for controlling modern automobile equipment which may overheat such as engines, air conditioners and pollution equipment. Further useful applications for the silver and copper lanthanide chalcogenides of the invention include controlling rocket engines and controlling lighting systems for spacecraft and satellites which are exposed to hot and cold temperatures.

The silver and copper lanthanide chalcogenides of the invention are prepared by a repeated melting cooling process over a time period of at least a week to form an electronically active, single phase, crystalline material.

It has been found that the metal lanthanide sulfides are pure dielectrics and may be used in charge storage devices such as capacitors, the metal lanthanide selenides have Schottky type semiconductor properties and the metal lanthanide tellurides are ceramics with metallic-like conductor properties.

Additionally, it has been found that certain metal lanthanide chalcogenides/mixed metal chalcogenides have electron conductive temperature dependency that parallels the low temperature superconductivity of yttrium barium copper oxide. These mixed metal chalcogenides are, in turn, superconductive at higher temperatures than the temperature at which yttrium barium copper oxide becomes superconductive.

Accordingly, these compounds may be used as thermally reversible switches which turn on current when there is a temperature increase and which turn off current when there is a temperature decrease.

DETAILED DESCRIPTION OF THE INVENTION AND PREFERRED EMBODIMENTS

Figure 1:
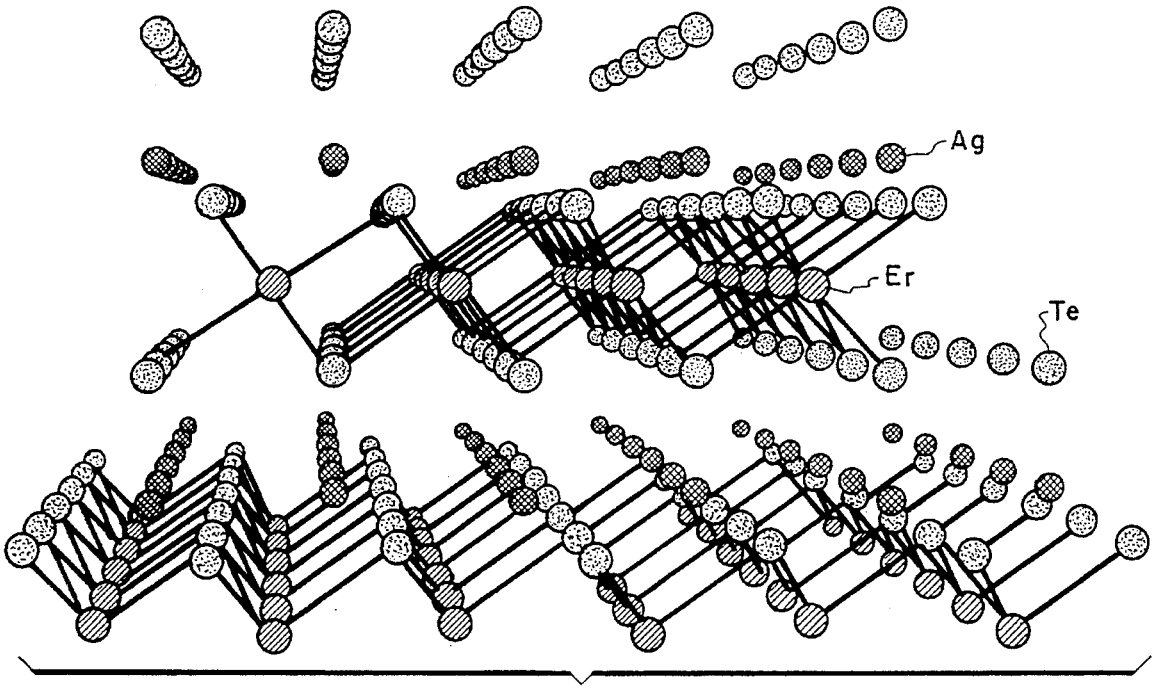
FIG. 1 is a perspective view illustrating the crystal structure of the trigonal phase of the mixed metal chalcogenide $AgErTe_2$ of the present invention.

The mixed metal chalcogenides constituting the present invention include chemical compounds having the formula $MLnX_2$, where M represents one of the elements copper, silver or gold (Cu, Ag, or Au); Ln represents any one of the 14 metals in the lanthanide family of elements in the periodic table, atomic numbers 58–71, with the exception of radioactive promethium, as follows: cerium, lanthanum, praseodymium, neodymium, samarium, europium, gadolinium, terbium, dysprosium, holmium, erbium, thulium, ytterbium, and lutetium (Ce,La,Pr,Nd,Sm, Eu,Gd,Tb,Dy,Ho, Er,Tm, Yb and Lu); and X represents sulfur, selenium or tellurium (S, Se or Te) in the chalcogenide family of elements. Promethium (Pm) is excluded because its only known isotope is radioactive and has a half life of less than 1 hour.

The preferred compounds of the present invention are formed using the silver and copper lanthanide chalcogenides.

The mixed metal chalcogenides constituting the invention and having the formula $MLnX_2$ exhibit electrical properties ranging from dielectrics to semiconductors to metallic conductors over a wide temperature range of −50° C. to in excess of 100° C.

Dielectrics are generally embodied by those compounds which contain either silver or copper in combination with a lanthanide metal (e.g. europium, dysprosium, erbium, gadolinium) and sulfur having the formula $MLnS_2$ where M is Ag or Cu, and Ln is a lanthanide metal such as Eu, Dy, Er or Gd.

Semiconductors are generally embodied by those compounds which contain either silver, or copper in combination with a lanthanide metal (e.g. europium, dysprosium, erbium, gadolinium) and selenium having the formula $MLnSe_2$ where M is Ag or Cu, and Ln is a lanthanide metal such as Eu, Dy, Er or Gd.

Metallic conductors are generally embodied by those compounds which contain either silver or copper in combination with a lanthanide metal (e.g. europium, dysprosium, erbium, gadolinium) and tellurium of the formula $MLnTe_2$ where M is Ag or Cu, and Ln is a lanthanide metal such as Eu, Dy, Er or Gd.

The mixed metal chalcogenides of the invention are prepared according to a preferred embodiment by mixing the three basic materials in powder form, that is the metal, which may be silver or copper, the element from the lanthanide family which may be, for example, dysprosium or gadolinium, and the chalcogen which may be sulfur, selenium or tellurium in stoichiometric proportions in a molar ratio of about 1:1:2. The resulting mixture of these three basic elements is then slowly fused under vacuum by sealing the mixture in quartz tubes, evacuating the same, and slowly heating the mixture over an extended time period at an elevated temperature, for example, of 1150° C. After the reaction to form the particular lanthanide chalcogenide is completed, the resulting product is cooled and may be analyzed during the cooling period by using X-ray powder diffraction to determine the crystal structure of the particular lanthanide chalcogenide compound. The pure crystallography phases of the lanthanide chalcogenide compounds can also be monitored by using x-ray crystallography.

Figure 2:
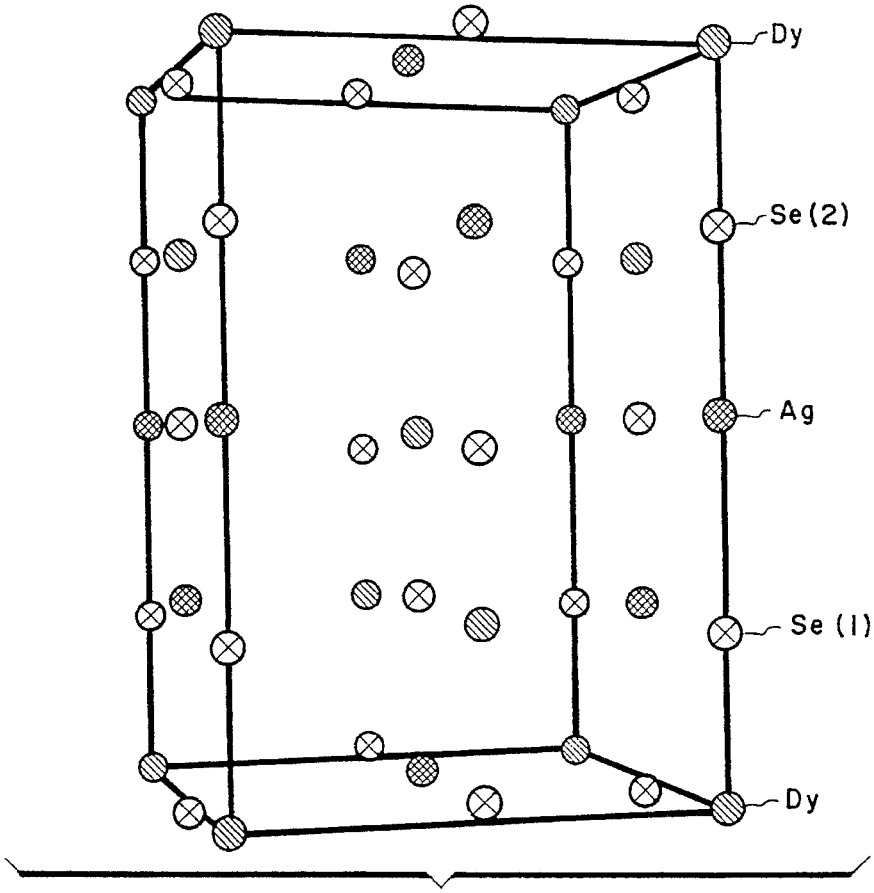
FIG. 2 is a perspective view illustrating the crystal structure of the tetragonal phase of the mixed metal chalcogenide $AgDySe_2$ of the present invention.
Figure 3:
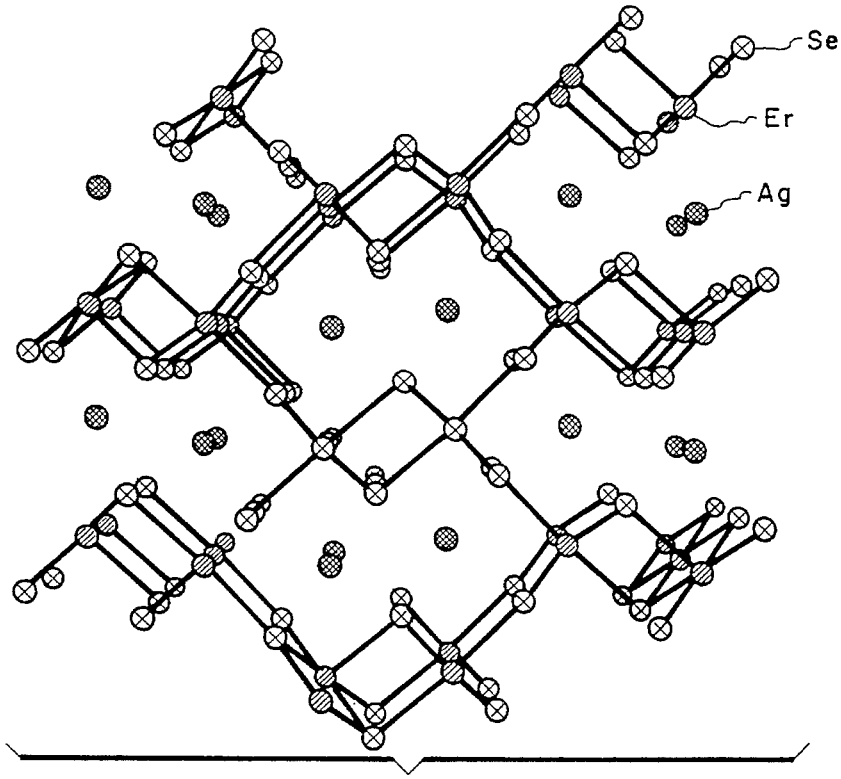
FIG. 3 is a perspective view illustrating the crystal structure of the orthorhombic phase of the mixed metal chalcogenide $AgErSe_2$ of the present invention.
Figure 4:
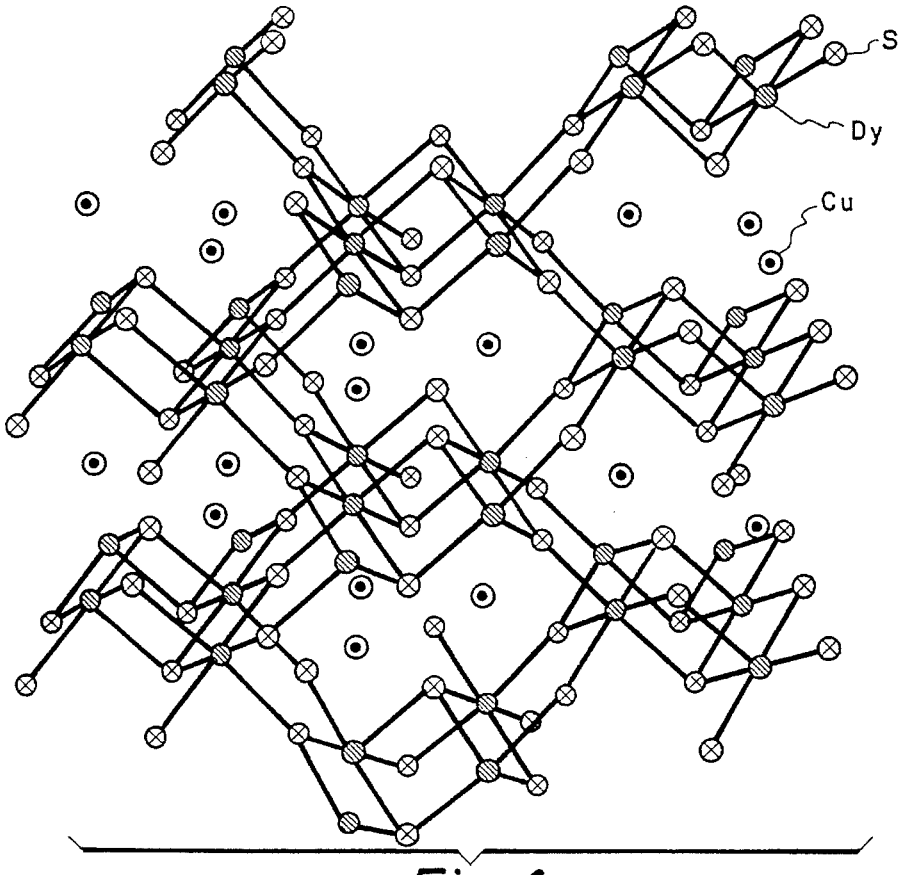
FIG. 4 is a perspective view illustrating the crystal structure of the orthorhombic phase of the mixed metal chalcogenide $CuDyS_2$ of the present invention.

Referring to FIGS. 1 through 4, the mixed metal chalcogenides of the invention have a crystal structure which is trigonal, tetragonal, orthorhombic or octahedral. FIG. 1 illustrates the crystal structure of the trigonal phase of the mixed metal chalcogenide $AgErTe_2$, FIG. 2 illustrates the crystal structure of the tetragonal phase of the mixed metal chalcogenide $AgDySe_2$, FIG. 3 illustrates the crystal structure of the orthorhombic phase of the mixed metal chalcogenide $AgErSe_2$ and FIG. 4 illustrates the orthorhombic phase of the mixed metal chalcogenide $CuDyS_2$.

Figure 6:
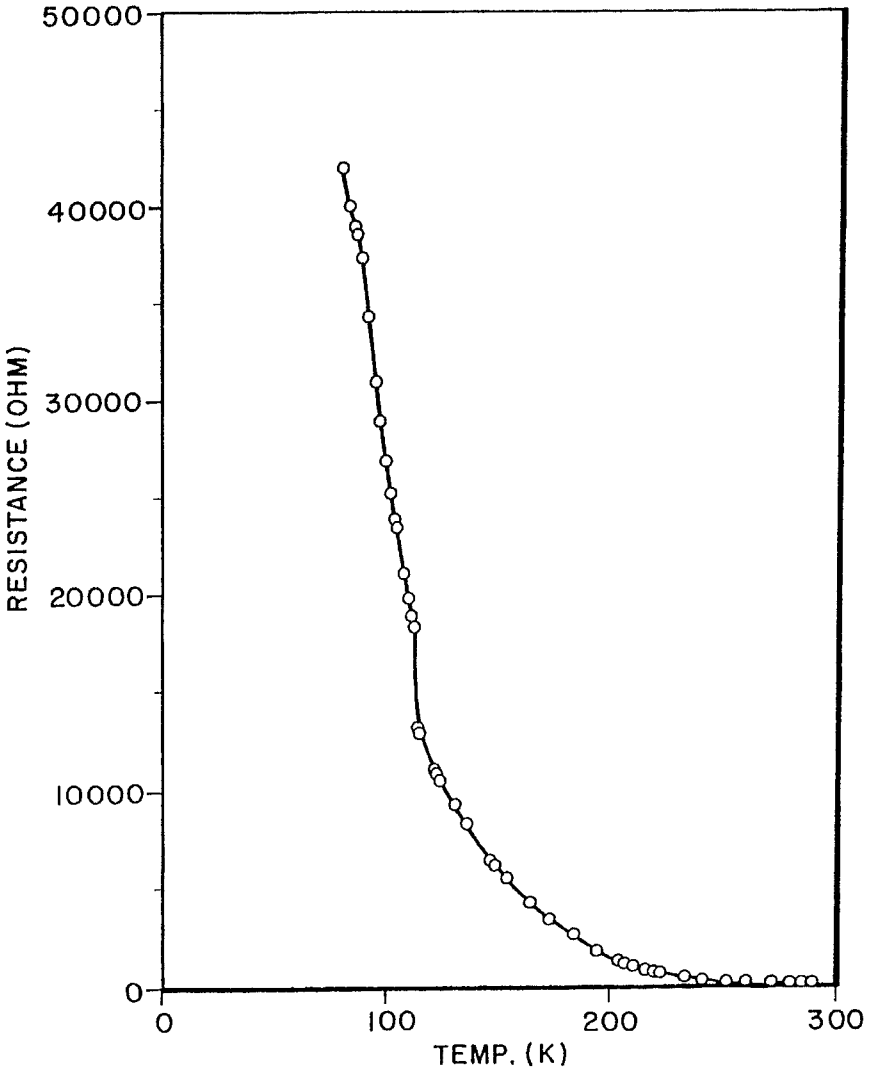
FIG. 6 is a graphical representation of the conductivity of the mixed metal chalcogenide $AgErTe_2$ as a function of temperature.
Figure 5:
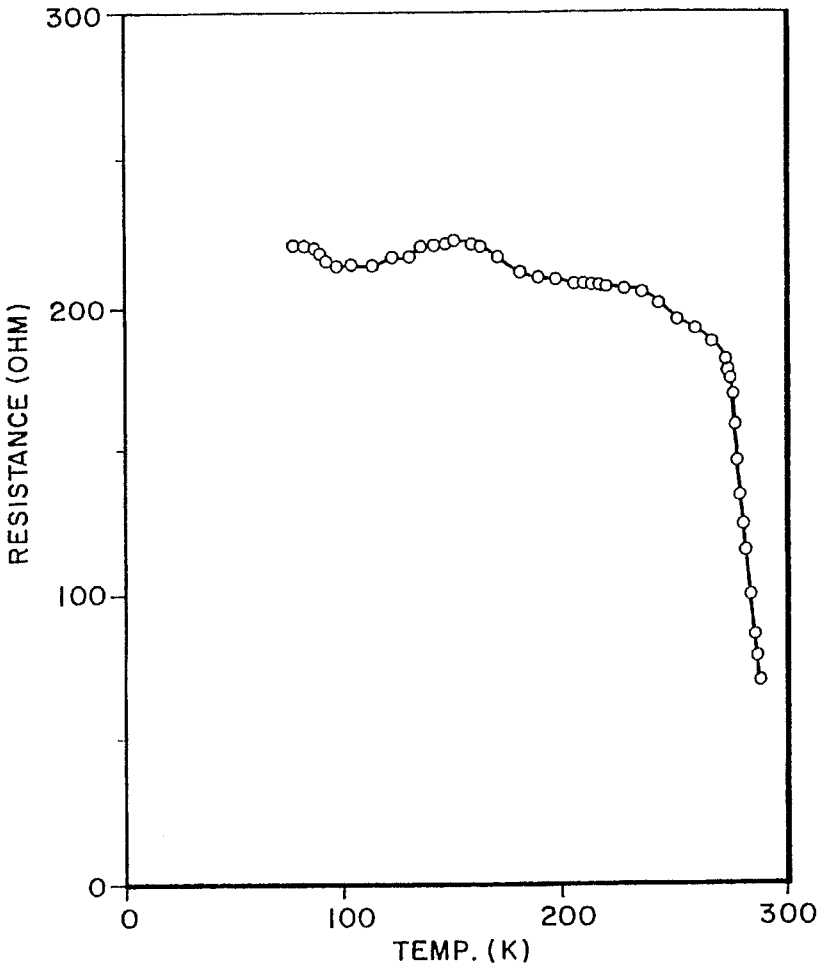
FIG. 5 is a graphical representation of the conductivity of the mixed metal chalcogenide $AgErSe_2$ as a function of temperature.

Referring to FIGS. 5 and 6, the mixed metal chalcogenides of the invention can be produced as thin wafers, pellets or crystals that conduct electricity above a specific transition temperature $T_c$ and are non-conductive below temperature $T_c$. Thus a current can be allowed to flow in an amplifier or signal generating circuit fabricated from the mixed metal chalcogenides of the invention when the material is warmed above $T_c$, but the current can be stopped as soon as the temperature drops below $T_c$. For example, FIG. 5 illustrates the conductivity of $AgErSe_2$ as a function of temperature measured in degrees Kelvin, while FIG. 6 illustrates the conductivity of $AgErTe_2$ as a function of temperature. As is best illustrated in FIG. 6, when the temperature of $AgErTe_2$ is about 250° K., the material $AgErTe_2$ transitions from a nonconductor (at temperatures below 250° K.) to a conductor (at temperatures above 250° K.). Thus, mixed metal chalcogenides of the invention can be used in electronic microcircuits as thermal "on-off" switches replacing conventional diode and transistor materials such as silicon and gallium arsenide.

It should also be noted that the mixed metal chalcogenide $AgErTe_2$ has an electron conductive temperature dependency that parallels the low temperature superconductivity of yttrium barium copper oxide. This mixed metal chalcogenides is, in turn, superconductive at higher temperatures (about 250° K.) than the temperature at which yttrium barium copper oxide becomes superconductive.

The electrical components of the invention, in the general class of silver, copper or gold lanthanide chalcogenides, can be formed into electronic components or used in electronic "microchip" devices in conjunction with electrically conducting metals (such as copper, silver or gold) and nonconductors (such as silicon oxide or aluminum oxide insulators). The lanthanide chalcogenides hereof can be sputter-coated onto various substrates. The following are examples illustrating production of the mixed metal chalcogenides of the invention:

EXAMPLE 1

Silver Dysprosium Disulfide (AgDyS2).

A mixture was made of 108 grams of silver powder, 162.5 grams of dysprosium powder and 64 grams of powdered sulfur (1:1:2 molar ratio) under a nitrogen atmosphere in a glove box. About 3.0 grams of this mixture was placed in a 6 inch quartz tube which was evacuated and sealed under vacuum, using a high performance diffusion pump and a mercury manometer (vacuum was below 1 torr). The quartz tube was placed in a tubular furnace and was slowly heated to 1150° C. over a 5 day period. The mixture was held at 1150° C. for another 5 hours, then it was cooled to 700° C. over a week, and finally held at 650° to 700° C. for another 90 days. The quartz tube was then removed from the furnace and analyzed for purity using x-ray powder diffraction. The resultant material has a tetragonal form crystal structure.

EXAMPLE 2

Copper Gadolinium Disulfide ($CuGdS_2$).

A mixture of 63.5 grams of copper powder, 157.25 grams of gadolinium powder and 64 grams of sulfur powder were mixed under nitrogen in a glove bag. About 3.5 grams of this mixture was placed in a 6 inch quartz tube, which was then evacuated and sealed under vacuum. The tube was slowly heated to 1150° C. for a period of 7 days, and then the tube was held at this temperature for another 8 hours. The tube was then cooled to 700° C. slowly, over a week, and was then held at 650° C. to 700° C. for 45 days. Finally, the tube was cooled to room temperature and the powder was removed. The powder was analyzed via x-ray diffraction (XRD) until the monoclinic phase was obtained.

EXAMPLE 3

Copper Erbium Disulfide ($CuErS_2$).

Copper, erbium, and sulfur powders were mixed in 1:1:2 molar ratios under a nitrogen atmosphere. About 3.5 grams of this mixture was placed in a quartz tube which was evacuated and sealed under vacuum. The tube was slowly heated to 1150° C. over a 3 day period, held at 1150° C. for 3 hours, cooled to 700° C. over a week and held at 650° C. to 700° C. for 4 months. During this period the material was analyzed by x-ray powder diffraction until the orthorhombic phase was obtained.

EXAMPLE 4

Copper Dysprosium Disulfide ($CuDyS_2$).

Copper, dysprosium, and sulfur powders were mixed in 1:1:2 molar ratios under a nitrogen atmosphere. About 3.5 grams of this mixture was placed in a quartz tube which was evacuated and sealed under vacuum. The tube was slowly heated to 1150° C. over a 3 day period, held at 1150"C. for 3 hours, cooled to 700° C. over a week and held at 650° C. to 700° C. for 3.5 months. During this period the material was analyzed by x-ray powder diffraction until the orthorhombic phase of FIG. 4 was obtained.

EXAMPLE 5

Silver Erbium Disulfide ($AgErS_2$).

Silver, erbium, and sulfur powders were mixed in 1:1:2 molar ratios. About 3.0 grams of this mixture was placed in a quartz tube which, after evacuation, was sealed. The tube was slowly heated to 1150° C. over 10 days, held at 1150° C. for 6 hours, cooled to 700° C. over a week and held at 650° C. to 700° C. for 5 weeks. After this time the pure tetragonal phase was obtained, as indicated by x-ray powder diffraction.

EXAMPLE 6

Silver Gadolinium Disulfide ($AgGdS_2$).

Figure 8:
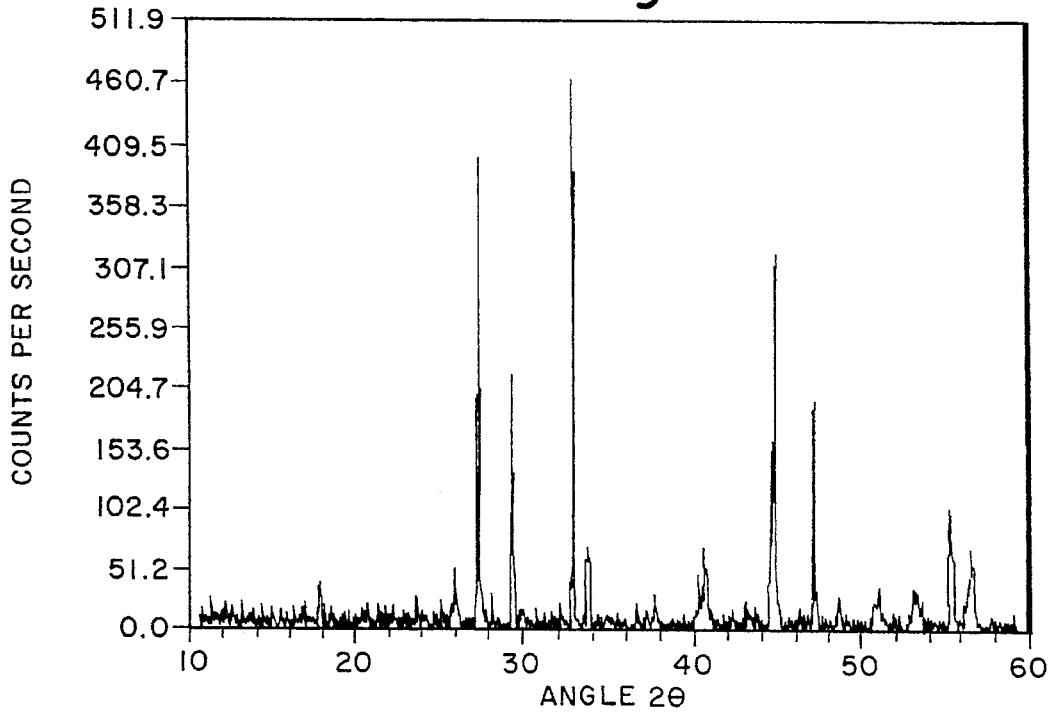
FIG. 8 is a graphical representation of the X-Ray Powder Diffraction Pattern for the mixed metal chalcogenide $AgErSe_2$.

Silver, gadolinium, and sulfur powders were mixed in 1:1:2 molar ratios under a nitrogen atmosphere. About 3.0 grams of this mixture was placed in a quartz tube which was evacuated and sealed under vacuum. The tube was slowly heated to 1150° C. over a 7 day period, held at 1150° C. for 8 hours, cooled to 700° C. over a week and held at 650° C. to 700° C. for 1 month. During this period the material was analyzed by x-ray powder diffraction until the tetragonal phase was obtained. FIG. 8 illustrates the x-ray powder diffraction pattern for $AgGdS_2$.

EXAMPLE 7

Silver Dysprosium Diselenide ($AgDySe_2$).

Silver, Dysprosium and selenium powders were mixed in a 1:1:2 molar ratio. The mixture was placed in a quartz tube which was evacuated and sealed under vacuum. The mixture was slowly heated in the sealed quartz tube to 1150° C., followed by slow cooling to 550° C., at which temperature the samples were maintained for 3–4 months. During this period the material was periodically analyzed by x-ray powder diffraction until the single orthorhombic phase was obtained.

EXAMPLE 8

Silver Erbium Diselenide ($AgErSe_2$).

Silver, erbium, and selenium powder were mixed in 1:1:2 molar ratio and placed in quartz tubes. The tubes were evacuated and sealed. The tubes were then heated over 3 days to 1150° C., held at this temperature for 2–3 hours and cooled over 2 days to 700° C., at which temperature the tubes were maintained for 3–4 months. During this period the material was periodically analyzed by x-ray powder diffraction until only the single tetragonal phase was obtained.

EXAMPLE 9

Silver Erbium Diselenide ($AgErSe_2$).

Silver, erbium, and selenium powder were mixed in 1:1:2 molar ratio under a nitrogen atmosphere. About 3.5 grams of this mixture were placed in a quartz tube which was evacuated and sealed under vacuum. The tube was slowly heated to 1150° C. over a 3 day period, held at this temperature for 3 hours, cooled to 700° C. over a week and held at 650° C. to 700° C. for 4 months. During the 4 month period the material was analyzed until the single orthorhombic phase of FIG. 3 was obtained.

EXAMPLE 10

Silver Dysprosium Diselenide ($AgDySe_2$).

Silver, Dysprosium and selenium powders were mixed in a 1:1:2 molar ratio, placed in quartz tubes, evacuated and sealed, heated over 3 days to 1150° C. and maintained at this temperature for 2–3 hours. The tubes were then cooled over 2 days to 700° C. and maintained at this temperature for 3–4 months. During this 3–4 month period the material was periodically analyzed by x-ray powder diffraction until only the single tetragonal phase of FIG. 2 was obtained.

EXAMPLE 11

Silver Erbium Ditelluride ($AgErTe_2$).

Silver, erbium, tellurium powders were mixed in a 1:1:2 molar ratio, placed in quartz tubes, evacuated and sealed, heated over 3 days to 1150° C. and maintained at this temperature for 2–3 hours. The tubes were then slowly cooled to 600° C. and maintained at this temperature for a time period of 2–3 months. During this 2–3 month time period the material was periodically analyzed by x-ray powder diffraction until only a single trigonal phase, FIG. 1, was present.

EXAMPLE 12

Formation of Pellets.

A pellet was formed by uniaxial compression of 150 mg of silver lanthanum diselenide powder in a 0.125 inch diameter die at 3000 lbs. of force. Electrodes were applied as a gold powder on the front and back surfaces or the pellet, and the powder was pressed into a gold foil at 2000 lbs. The pellets were mounted in a spring loaded measurement cell and enclosed in a vessel of dry argon gas to keep out moisture. This entire apparatus, with the pellet specimens, was placed inside an environmental chamber where temperatures could be varied from −50° C. to +100° C.

Referring to FIGS. 1–4, Tables I, II, III and IV disclose the bond lengths and angles/atomic positions (X, Y, Z coordinates) for the single phase crystal structures respectively of FIGS. 1, 2, 3 and 4. It should be understood that any conventional and well known X-ray crystallography computer software program may be used to calculate the bond length and angles of the crystal structures illustrated in FIGS. 1, 2, 3 and 4. The pattern calculated for the trigonal space group $P3m_1$, FIG. 1, is as follows:

TABLE I

| | X | Y | Z |
|---|---|---|---|
| Er | 0.0 | 0.0 | 0.0 |
| Ag | 1/3 | 2/3 | 0.413 |
| Te (1) | 1/3 | 2/3 | 0.776 |
| Te (2) | 1/3 | 2/3 | 0.254 |

Bond Lengths:
a = 4.30 Å
c = 7.00 Å

The pattern calculated for the tetragonal space group $I4_1md$, FIG. 2, is as follows:

TABLE II

| | X | Y | Z |
|---|---|---|---|
| Ag | 0.0 | 0.0 | 0.54 |
| Dy | 0.0 | 0.0 | 0.00 |
| Se (1) | 0.0 | 0.0 | 0.23 |
| Se (2) | 0.0 | 0.0 | 0.77 |

Bond Lengths:
a = b = 5.53 Å
c = 11.803 Å

The pattern calculated for the orthorhombic space group $P2_12_12_1$, is as follows:

TABLE III

| | X | Y | Z |
|---|---|---|---|
| Ag | 0.296 | 0.379 | 0.002 |
| Er | 0.290 | 0.129 | 0.230 |
| Se (1) | 0.085 | 0.227 | 0.730 |
| Se (2) | 0.485 | 0.027 | 0.728 |

Bond Lengths:
a = 6.88 Å
b = 13.79 Å
c = 4.18 Å

The pattern calculated for the orthorhombic space group $P2_12_12_1$, FIG. 4, is as follows:

TABLE IV

| | X | Y | Z |
|---|---|---|---|
| Ag | 0.30 | 0.38 | 0.00 |
| Dy | 0.29 | 0.13 | 0.23 |
| S (1) | 0.08 | 0.23 | 0.73 |
| S (2) | 0.48 | 0.03 | 0.73 |

Bond Lengths:
a = 6.88 Å
b = 13.79 Å
c = 4.18 Å

ELECTRICAL TESTS

Electrical measurements were taken on pellets of the following mixed metal chalcogenides: $ErCuS_2$; $ErAgSe_2$; $ErAgTe_2$; $DyCuS_2$ and $DyAgSe_2$. The pellets of these mixed metal chalcogenides were formed by uniaxially pressing approximately 150 mg of powder in a 0.125 diameter die at 3000 pounds of force. Electrodes were applied as Au powder and subsequently pressed at 2000 pounds force to form uniform thin foil contacts. The pellets were mounted in a spring loaded measurement cell and enclosed in a vessel containing a dry argon atmosphere. This spring loaded measurement cell was then placed inside an environmental chamber where temperatures were varied from −50° C. to +100° C. Pressed powder gold, that is a pressed sandwich of powdered gold, powdered $ErAg_2Te_2$, for example, powdered gold, was found to provide excellent electrode contacts.

The conductivity of each sample of the above mixed metal chalcogenides was determined using a Solartron 1174 Frequency Response Analyzer over a wide frequency range (1–106 Hz). Complex impedance diagrams obtained in this fashion were interpreted using a laboratory computer program published as follows (M. Kleitz and J. H. Kennedy, "Fast Ion Transport in Solids", ed. P. Vashishta, J. N. Mundy and G. K. Shenoy, eds. p. 185, Elsevier/North Holland, Amsterdam, Netherlands (1979).

Figure 9:
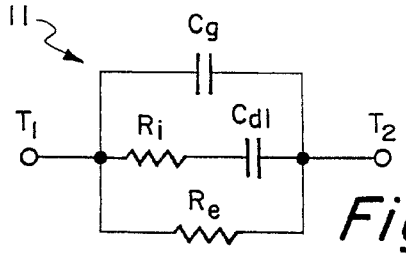
FIG. 9 is an electrical schematic diagram of the mixed metal chalcogenides constituting the present invention.

Referring to FIG. 9, with electrodes T1 and T2 the equivalent circuit 11 the mixed metal chalcogenide samples is illustrated in FIG. 9. The capacitor $C_g$ is the geometric capacitance (~10 pF), $C_{dl}$ is the double layer capacitance (~10 pF), $R_i$ is the ionic transport resistance, and $R_e$ is the electronic transport resistance.

Small temperature intervals (4–5° C.) were employed to ascertain the existence and temperature for any phase transitions. Temperature of each sample was held constant with a Eurotherm controller for at least 10 minutes before impedance measurements were made to ensure thermal equilibrium.

Results for the electrical test for the mixed metal chalcogenides: $CuErS_2$; $AgErSe_2$; $AgErTe_2$; $CuDyS_2$ and $AgDySe_2$ are summarized as follows:

Copper Erbium Disulfide ($CuErS_{21}$).

This material was highly resistive. The DC resistivity tended to decrease with temperature. At low temperatures, the material was insulating. This was reflected in impedance spectra data for temperatures between −50° C. and +22° C., which depicted a virtually pure dielectric behavior of $CuErS_2$ at these low temperatures. At a temperature of approximately 100° C., the DC conductivity was found to be $8\times10^{-5}$ S/cm. Low frequency deviations became more severe at lower temperatures, as was found in data taken at 79° C. This scatter is coupled with the fact that the signal to noise ratio was low at the low frequency measurements.

Silver Erbium Diselenide ($AgErSe_2$).

The impedance spectra was generally complex indicating a semiconductor Schottky contact was formed between the $AgErSe_2$ pellet and the Au electrodes.

Silver Erbium Ditelluride ($AgErTe_2$).

This material demonstrated very low resistance at all temperatures, with a resistivity less than 0.5 ohm-cm above 250° K. (see FIG. 6). The behavior of $AgErTe_2$ was found to be metallic.

Copper Dysprosium Disulfide ($CuDyS_2$).

Complex impedance measurements of this material were taken from 20° C. to 100° C. Due to high sample resistance, data below 100 Hz were obscured by noise. At room temperature (approximately 20° C.) conductivity values of $1.3\times10^{-6}$ S/cm and capacitance values of 25 pF were obtained. The conductivity of the sample increased with temperature up to 62° C. and decreased with measurements taken at ≧74° C. After cooling the sample to room temperature, its conductivity returned to the initial value.

Silver Dysprosium Diselenide ($AgDySe_2$), orthorombic phase.

Complex impedance measurements were taken from −50° C. to +100° C. At temperatures less that 0° C., data measurements taken at less than $10^3$ Hz were obscured by noise. Conductivity was $1.0\times10^{-6}$ S/cm at room temperature and capacitance was 275 pF. No reversal in conductivity increase with temperature was noted for $DyAgSe_2$.

Figure 7:
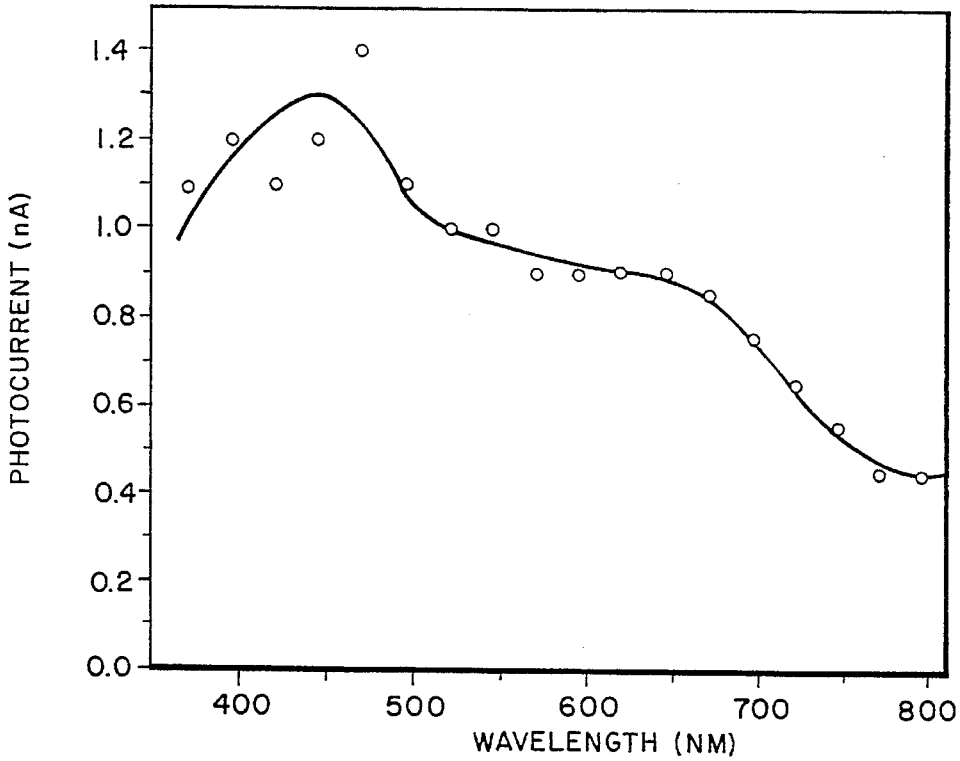
FIG. 7 is a graphical representation of the conductivity of the mixed metal chalcogenide $AgDySe_2$ as a function of the wavelength of incident light.

Referring to FIG. 7, there is shown a graph which illustrates the current flow in a nanoamps of a Silver Dysprosium Diselenide ($AgDySe_2$) pellet as a function of the wavelength of incident light in nanometers. Thus, it can be seen that Silver Dysprosium Diselenide can be used in the fabrication of photo-electric devices such as optical couplers, optoisolators, light detectors and like optoelectronic devices.

It should also be noted that the mixed metal chalcogenides having the chemical formula $AuDySe_2$ (Gold Dysprosium Diselenide) and the mixed metal chalcogenides having the chemical formula $CuDySe_2$ (Copper Dysprosium Diselenide) exhibit similar electrical properties, that is each of these mixed metal chalcogenides generates a light induced photocurrent in response incident on the material.

From the foregoing, it may be seen that the invention provides a series of mixed metal chalcogenides in the form of a family of silver, copper and gold lanthanide chalcogenides having highly useful electrical characteristics over a wide range of temperatures. Obviously many modifications and variations of the present invention are possible in light of the above teachings. It is therefore to be understood that within the scope of the appended claims the invention may be practiced otherwise than as specifically described.

What is claimed is:

1. A light sensitive material consisting of a mixed metal chalcogenides having the chemical formula $AgDySe_2$ and having electrical properties, the electrical properties of said light sensitive material include generating a light induced direct current in response to light incident upon said light sensitive material in a range of about 400 nanometers to about 700 nanometers, said light induced direct current having a range of about 0.6 nanoamps to about 1.3 nanoamps.

* * * * *